United States Patent
Kook et al.

(10) Patent No.: US 9,791,024 B2
(45) Date of Patent: Oct. 17, 2017

(54) PLANETARY GEAR TRAIN OF AUTOMATIC TRANSMISSION FOR VEHICLE

(71) Applicant: Hyundai Motor Company, Seoul (KR)

(72) Inventors: Jae Chang Kook, Hwaseong-si (KR); Seong Wook Hwang, Gunpo-si (KR); Woo Jin Chang, Suwon-si (KR); Wonmin Cho, Hwaseong-si (KR); Hyun Sik Kwon, Seoul (KR); Wookjin Jang, Yongin-si (KR); Seongwook Ji, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/196,313

(22) Filed: Jun. 29, 2016

(65) Prior Publication Data
US 2017/0159765 A1    Jun. 8, 2017

(30) Foreign Application Priority Data

Dec. 2, 2015 (KR) .................. 10-2015-0171008

(51) Int. Cl.
*F16H 3/66* (2006.01)

(52) U.S. Cl.
CPC ....... *F16H 3/66* (2013.01); *F16H 2200/0069* (2013.01); *F16H 2200/0086* (2013.01); *F16H 2200/2012* (2013.01); *F16H 2200/2046* (2013.01)

(58) Field of Classification Search
CPC ............ F16H 3/66; F16H 2200/0069; F16H 2200/2046; F16H 2200/2012; F16H 2200/0086

USPC .......................... 475/275–291, 330
See application file for complete search history.

(56) References Cited

U.S. PATENT DOCUMENTS

| 8,047,954 B2 | 11/2011 | Phillips et al. |
| 8,303,455 B2 | 11/2012 | Gumpoltsberger et al. |
| 2016/0146306 A1* | 5/2016 | Cho ............... F16H 3/66 475/269 |
| 2016/0146308 A1* | 5/2016 | Cho ............... F16H 3/66 475/269 |
| 2016/0356344 A1* | 12/2016 | Ji ................. F16H 3/66 |
| 2016/0369871 A1* | 12/2016 | Hwang ............ F16H 3/66 |
| 2017/0074368 A1* | 3/2017 | Park .............. F16H 3/66 |

FOREIGN PATENT DOCUMENTS

| DE | 102014214008 A1 * | 1/2015 | ...... F16H 3/66 |
| JP | 2015-081667 A | 4/2015 | |
| KR | 10-1509726 B1 | 4/2015 | |

* cited by examiner

*Primary Examiner* — Roger Pang
(74) *Attorney, Agent, or Firm* — Morgan, Lewis & Bockius LLP

(57) ABSTRACT

A planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, and six friction elements selectively connecting the rotation elements, or selectively connecting at least one of the rotation elements and a transmission housing.

10 Claims, 2 Drawing Sheets

FIG. 2

| Speed stage | C1 | C2 | C3 | B1 | B2 | B3 | Gear ratio |
|---|---|---|---|---|---|---|---|
| D1 |  | ● |  | ● | ● |  | 4.822 |
| D2 | ● | ● |  |  |  | ● | 2.940 |
| D3 | ● | ● |  | ● |  |  | 1.808 |
| D4 | ● |  | ● |  | ● |  | 1.556 |
| D5 |  | ● | ● |  | ● |  | 1.162 |
| D6 |  | ● | ● | ● |  |  | 1.000 |
| D7 |  | ● | ● | ● |  |  | 0.782 |
| D8 | ● |  | ● |  |  | ● | 0.708 |
| D9 | ● |  | ● | ● |  |  | 0.583 |
| D10 | ● |  | ● |  |  | ● | 0.487 |
| REV1 | ● |  |  |  | ● | ● | -4.900 |
| REV2 |  | ● |  |  | ● |  | -0.078 |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0171008, filed Dec. 2, 2015, the entire contents of which is incorporated herein for all purposes by this reference.

BACKGROUND OF THE INVENTION

Field of the Invention

The present invention relates to a planetary gear train of an automatic transmission for a vehicle. More particularly, the present invention relates to a planetary gear train of an automatic transmission for a vehicle which improves power delivery performance and fuel efficiency according to multiple speed stages as a consequence of achieving ten forward speed stages using a minimum number of constituent elements and improving silent driving by using driving point in a low engine speed.

Description of Related Art

The recent increase in oil prices has caused car makers to meet global demands for improving fuel efficiency.

As a result, research is being conducted on engines in terms of reducing weight and improving fuel efficiency by down-sizing, and research is also being conducted to ensure both drivability and competitiveness for maximizing fuel efficiency by implementing an automatic transmission with multiple speed stages.

However, in the case of the automatic transmission, as the number of internal components is increased as the number of gear shift stages is increased, and as a result, the automatic transmission may be difficult to mount, the manufacturing cost and weight may be increased, and power transmission efficiency may be deteriorated.

Accordingly, in the automatic transmission, development of a planetary gear train which may bring about maximum efficiency with a small number of components may be important in order to increase a fuel efficiency enhancement effect through the multiple speed stages.

In this aspect, in recent years, more than 8-speed automatic transmissions tend to be implemented and mounted on vehicles, and the research and development of a planetary gear train capable of implementing more speed stages has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle which improves power delivery performance and fuel efficiency according to multi steps as a consequence of achieving ten forward speed stages and two reverse speed stages using a minimum number of constituent elements and improving silent driving by using driving point in a low engine speed.

According to various aspects of the present invention, a planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, and six friction elements selectively connecting the rotation elements, or selectively connecting at least one of the rotation elements and a transmission housing, in which the planetary gear train of the automatic transmission for the vehicle may further include a first rotation shaft including the first rotation element and directly connected to the input shaft, a second rotation shaft including the second rotation element and selectively connected to the transmission housing, a third rotation shaft including the third rotation element, the sixth rotation element and the ninth rotation element and selectively connected to the transmission housing, a fourth rotation shaft including the fourth rotation element and the eighth rotation element, a fifth rotation shaft including the fifth rotation element and selectively connected to the second rotation element, a sixth rotation shaft including the seventh rotation element and the tenth rotation element and selectively connected to the transmission housing, a seventh rotation shaft including the eleventh rotation element and directly connected to the output shaft, and an eighth rotation shaft including the twelfth rotation element and selectively connected to the second rotation shaft and the fourth rotation shaft.

The first planetary gear set may be a single pinion planetary gear set and include a first sun gear that is the first rotation element, a first planet carrier that is the second rotation element, and a first ring gear that is the third rotation element, the second planetary gear set may be a single pinion planetary gear set and include a second sun gear that is the fourth rotation element, a second planet carrier that is the fifth rotation element, and a second ring gear that is the sixth rotation element, the third planetary gear set may be a single pinion planetary gear set and include a third sun gear that is the seventh rotation element, a third planet carrier that is the eighth rotation element, and a third ring gear that is the ninth rotation element, and the fourth planetary gear set may be a single pinion planetary gear set and include a fourth sun gear that is the tenth rotation element, a fourth planet carrier that is the eleventh rotation element, and a fourth ring gear that is the twelfth rotation element.

The six friction elements may include a first clutch selectively connecting the fourth rotation shaft and the eighth rotation shaft, a second clutch selectively connecting the second rotation shaft and the eighth rotation shaft, a third clutch selectively connecting the second rotation shaft and the fifth rotation shaft, a first brake selectively connecting the third rotation shaft and the transmission housing, a second brake selectively connecting the sixth rotation shaft and the transmission housing, and a third brake selectively connecting the second rotation shaft and the transmission housing.

Speed stages achieved by selective operation of the friction elements include a first forward speed stage achieved by simultaneous operation of the second clutch, the first brake and the second brake, a second forward speed stage achieved by simultaneous operation of the first clutch, the second clutch and the third brake, a third forward speed stage achieved by simultaneous operation of the first clutch, the second clutch and the first brake, a fourth forward speed stage achieved by simultaneous operation of the first clutch, the third clutch and the second brake, a fifth forward speed stage achieved by simultaneous operation of the second clutch, the third clutch and the second brake, a sixth forward speed stage achieved by simultaneous operation of the first clutch, the second clutch and the third clutch, a seventh forward speed stage achieved by simultaneous operation of the second clutch, the third clutch and the first brake, an eighth forward speed stage achieved by simultaneous operation of the second clutch, the third clutch and the third brake, a ninth forward speed stage achieved by simultaneous operation of the first clutch, the third clutch and the first brake, a tenth forward speed stage achieved by simultaneous operation of the first clutch, the third clutch and the third brake, a first reverse speed stage achieved by simultaneous operation of the first clutch, the second brake and the third brake, and a second reverse speed stage achieved by simultaneous operation of the first clutch, the second clutch and the second brake.

According to various aspects of the present invention, a planetary gear train of an automatic transmission for a vehicle may include an input shaft receiving torque of an engine, an output shaft outputting changed torque of the engine, a first planetary gear set being a single pinion planetary gear set and including first, second, and third rotation elements, a second planetary gear set being a single pinion planetary gear set and including fourth, fifth, and sixth rotation elements, a third planetary gear set being a single pinion planetary gear set and including seventh, eighth, and ninth rotation elements, and a fourth planetary gear set being a single pinion planetary gear set and including tenth, eleventh, and twelfth rotation elements, in which the planetary gear train of the automatic transmission for the vehicle may include a first rotation shaft including the first rotation element and directly connected to the input shaft, a second rotation shaft including the second rotation element and selectively connected to the transmission housing, a third rotation shaft including the third rotation element, the sixth rotation element and the ninth rotation element and selectively connected to the transmission housing, a fourth rotation shaft including the fourth rotation element and the eighth rotation element, a fifth rotation shaft including the fifth rotation element and selectively connected to the second rotation shaft, a sixth rotation shaft including the seventh rotation element and the tenth rotation element and selectively connected to the transmission housing, a seventh rotation shaft including the eleventh rotation element and directly connected to the output shaft, an eighth rotation shaft including the twelfth rotation element and selectively connected to the second rotation shaft and the fourth rotation shaft, a first clutch selectively connecting the fourth rotation shaft and the eighth rotation shaft, a second clutch selectively connecting the second rotation shaft and the eighth rotation shaft, a third clutch selectively connecting the second rotation shaft and the fifth rotation shaft, a first brake selectively connecting the third rotation shaft and the transmission housing, a second brake selectively connecting the sixth rotation shaft and the transmission housing, a third brake selectively connecting the second rotation shaft and the transmission housing.

The first planetary gear set may include a first sun gear that is the first rotation element, a first planet carrier that is the second rotation element, and a first ring gear that is the third rotation element, the second planetary gear set includes a second sun gear that is the fourth rotation element, a second planet carrier that is the fifth rotation element, and a second ring gear that is the sixth rotation element, the third planetary gear set includes a third sun gear that is the seventh rotation element, a third planet carrier that is the eighth rotation element, and a third ring gear that is the ninth rotation element, and the fourth planetary gear set includes a fourth sun gear that is the tenth rotation element, a fourth planet carrier that is the eleventh rotation element, and a fourth ring gear that is the twelfth rotation element.

According to various aspects of the present invention, a planetary gear train of an automatic transmission for a vehicle may include an input shaft receiving torque of an engine, an output shaft outputting changed torque of the engine, a first planetary gear set that is a single pinion planetary gear set and includes a first sun gear, a first planet carrier, and a first ring gear, a second planetary gear set that is a single pinion planetary gear set and includes a second sun gear, a second planet carrier, and a second ring gear, a third planetary gear set that is a single pinion planetary gear set and includes a third sun gear, a third planet carrier, and a third ring gear, and a third planetary gear set that is a single pinion planetary gear set and includes a third sun gear, a third planet carrier, and a third ring gear, and wherein the planetary gear train of an automatic transmission for a vehicle may include a first rotation shaft including the first sun gear and directly connected to the input shaft, a second rotation shaft including the first planet carrier and selectively connected to a transmission housing, a third rotation shaft including the first ring gear, the second ring gear and the third ring gear and selectively connected to the transmission housing, a fourth rotation shaft including the second sun gear and the third planet carrier, a fifth rotation shaft including the second planet and selectively connected to the second rotation shaft, a sixth rotation shaft including the third sun gear and the fourth sun gear selectively connected to the transmission housing, a seventh rotation shaft including the fourth planet and directly connected to the output shaft, an eighth rotation shaft including the fourth ring gear and selectively connected to the second rotation shaft and the fourth rotation shaft, and six friction elements selectively connecting the rotation shafts, or selectively connecting at least one rotation shaft and the transmission housing.

A planetary gear train of an automatic transmission for a vehicle according to various embodiments of the present invention may achieve more than ten forward speed stages and two reverse speed stages by combining four planetary gear sets that are simple planetary gear sets with six friction elements.

Further, a planetary gear train of an automatic transmission for a vehicle according to various embodiments of the present invention may greatly improve silent driving by achieving adequate speed stage to rotation number of the engine through multiple speed stages of the automatic transmission.

Further, a planetary gear train of an automatic transmission for a vehicle according to various embodiments of the present invention may maximize the efficiency of the engine operation through high efficiency multiple speed stages, and improve power delivery performance and fuel efficiency.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of friction elements at each speed stage in the planetary gear train according to an exemplary embodiment of the present invention.

Figure 1:
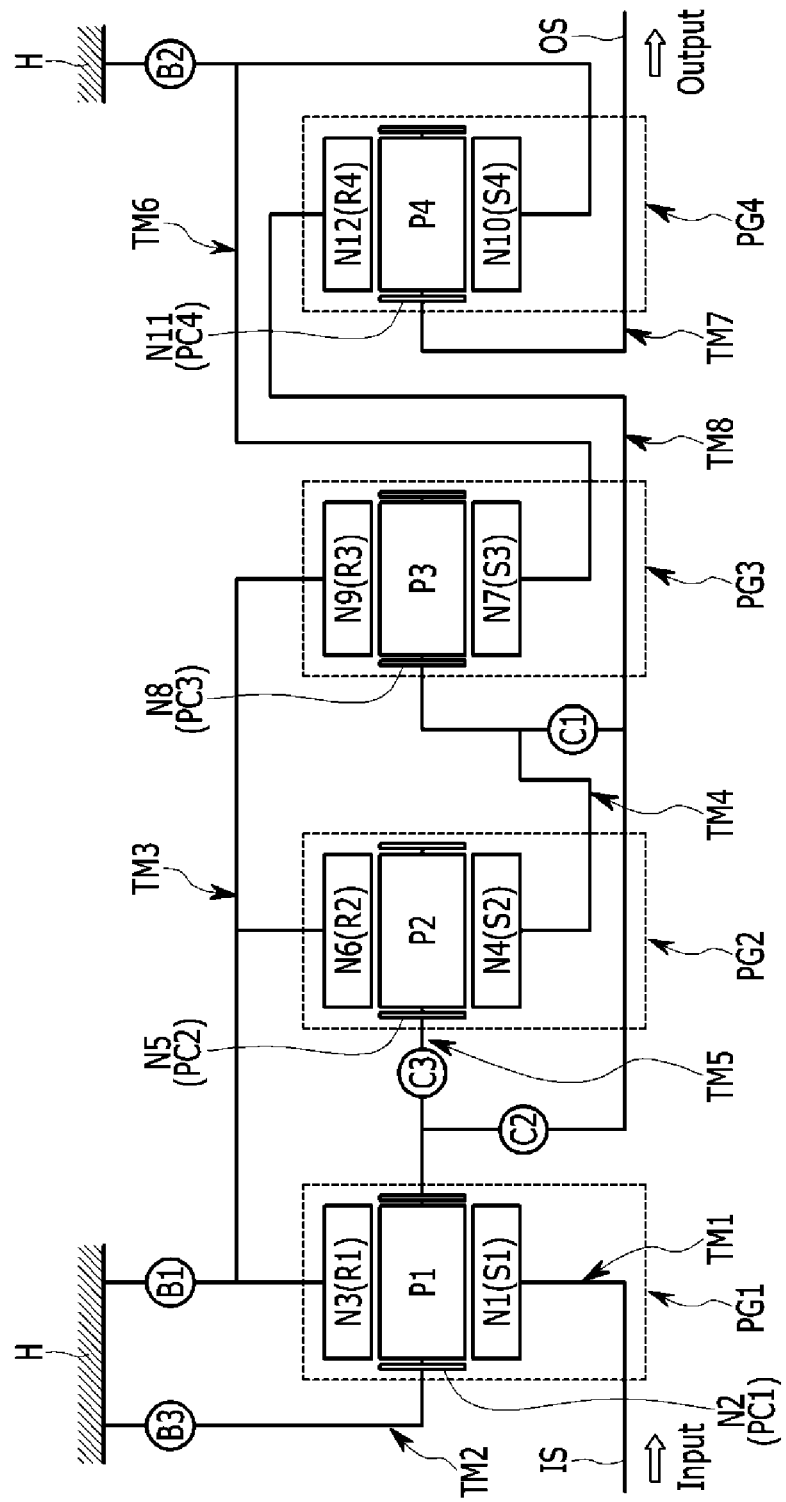
FIG. 1 is a schematic diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a planetary gear train according to various embodiments of the present invention.

Referring to FIG. 1, a planetary gear train according to various embodiments of the present invention includes first, second, third, fourth planetary gear sets PG1, PG2, PG3, and PG4 disposed on the same axis, an input shaft IS, an output shaft OS, eight rotations shafts TM1 to TM8 including at least one rotation elements of the first, second, third, and fourth planetary gear sets PG1, PG2, PG3, and PG4, six friction elements C1 to C3 and B1 to B3, and a transmission housing H.

As a result, torque input from the input shaft IS is changed by cooperation of the first, second, third, and fourth planetary gear sets PG1, PG2, PG3, and PG4, and the changed torque is output through the output shaft OS.

The planetary gear sets PG1, PG2, PG3, and PG4 are disposed sequentially from an engine side.

The input shaft IS is an input member and power from a crankshaft of an engine is torque-converted through a torque converter to be input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1 of a first rotation element N1, a first planet carrier PC1 of a second rotation element N2 rotatably supporting a first pinion P1 externally engaged the first sun gear S1, and a first ring gear R1 of a third rotation element N3 internally engaged with the first pinion P1.

The second planetary gear set PG2 is a single pinion planetary gear set and includes a second sun gear S2 of a fourth rotation element N4, a second planet carrier PC2 of a fifth rotation element N5 rotatably supporting a second pinion P2 externally engaged the second sun gear S2, and a second ring gear of a sixth rotation element N6 internally engaged with the second pinion P2.

The third planetary gear set PG3 is a single pinion planetary gear set and includes a third sun gear S3 of a seventh rotation element N7, a third planet carrier PC3 of an eighth rotation element N8 rotatably supporting a third pinion P3 externally engaged with the third sun gear S3, and a third ring gear R3 of a ninth rotation element N9 internally engaged with the third pinion P3.

The fourth planetary gear set PG4 is a single pinion planetary gear set and includes a fourth sun gear S4 of a tenth rotation element N10, a fourth planet carrier PC4 of an eleventh rotation element N11 rotatably supporting a fourth pinion P4 externally engaged with the fourth sun gear S4, and a fourth ring gear R4 of a twelfth rotation element N12 internally engaged with the fourth pinion P4.

The third rotation element N3 is directly connected to the sixth rotation element N6 and the ninth rotation element N9, the fourth rotation element N4 is directly connected to the eighth rotation element N8, the seventh rotation element N7 is directly connected to the tenth rotation element N10, and the first, second, third, and fourth planetary gear sets PG1, PG2, PG3, and PG4 are operated with eight rotation shafts TM1 to TM8.

The eight rotation shafts TM1 to TM8 will be described in further detail.

The first rotation shaft TM1 includes the first rotation element N1, and is directly connected to the input shaft IS so as to be always operated as an input element.

The second rotation shaft TM2 includes the second rotation element N2, and is selectively connected to the transmission housing H so as to be operated as a selective fixed element.

The third rotation shaft TM3 includes the third rotation element N3, the sixth rotation element N6 and the ninth rotation element N9, and selectively connected to the transmission housing H so as to be operated as a selective fixed element.

The fourth rotation shaft TM4 includes the fourth rotation element N4 and the eighth rotation element N8, and is directly connected to the input shaft IS so as to be always operated as an input element.

The fifth rotation shaft TM5 includes the fifth rotation element N5, and is selectively connected to the second rotation shaft TM2.

The sixth rotation shaft TM6 includes the seventh rotation element N7 and the tenth rotation element N10, and is selectively connected to the transmission housing H so as to be operated as a selective fixed element.

The seventh rotation shaft TM7 includes the eleventh rotation element N11, and is directly connected to the output shaft OS so as to be always operated as an output element.

The eighth rotation shaft TM8 includes the twelfth rotation element N12, and is selectively connected to the second rotation shaft TM2 and the fourth rotation shaft.

In addition, three clutches C1, C2, and C3 which are friction elements are disposed at connection portions between any two rotation shafts.

In addition, three brakes B1, B2, and B3 which are friction elements are disposed at connection portions between any one rotation shaft and the transmission housing H.

The six friction elements C1 to C3 and B1 to B3 will be described in further detail.

The first clutch C1 is disposed between the fourth rotation shaft TM4 and the eighth rotation shaft TM8 and selectively connects the fourth rotation shaft TM4 and the eighth rotation shaft TM8.

The second clutch C2 is disposed between the second rotation shaft TM2 and the eighth rotation shaft TM8 and selectively connects the second rotation shaft TM2 and the eighth rotation shaft TM8.

The third clutch C3 is disposed between the second rotation shaft TM2 and the fifth rotation shaft TM5 and selectively connects the second rotation shaft TM2 and the fifth rotation shaft TM5.

The first brake B1 is disposed between the third rotation shaft TM3 and the transmission housing H and causes the third rotation shaft TM3 so as to be operated as a selective fixed element.

The second brake B2 is disposed between the sixth rotation shaft TM6 and the transmission housing H and causes the sixth rotation shaft TM6 so as to be operated as a selective fixed element.

The third brake B3 is disposed between the second rotation shaft TM2 and the transmission housing H and causes the second rotation shaft TM2 so as to be operated as a selective fixed element.

The friction elements including the first, second, and third clutches C1, C2, and C3 and the first, second, and third brakes B1, B2, and B3 may be multi-plates friction elements of wet type that are operated by hydraulic pressure.

FIG. 2 is an operation chart of friction elements at each speed stage in the planetary gear train according to various embodiments of the present invention.

As shown in FIG. 2, three friction elements are operated at each speed stage in the planetary gear train according to various embodiments of the present invention. Shifting processes in the various embodiments of the present invention will be described in further detail.

The second clutch C2, the first brake B1 and the second brake B2 are simultaneously operated at a first forward speed stage D1. According to this, as the second rotation shaft TM2 is connected to the eighth rotation shaft TM8 by operation of the second clutch C2, torque of the input shaft IS is input to the first rotation shaft TM1. Further, as the third rotation shaft TM3 and the sixth rotation shaft TM6 are operated as fixed elements by the operation of the first brake B1 and the second brake B2, and torque input is changed by cooperation of the each rotation shaft to be a first forward speed stage and the changed torque is output through the output shaft OS including the seventh rotation shaft TM7.

The first clutch C1, the second clutch C2 and the third brake B3 are simultaneously operated at a second forward speed stage D2. According to this, the fourth rotation shaft TM4 is connected to the eighth rotation shaft TM8 by operation of the first clutch C1, as the second rotation shaft TM2 is connected to the eighth rotation shaft TM8 by operation of the second clutch C2, torque of the input shaft IS is input to the first rotation shaft TM1. Further, as the second rotation shaft TM2 is operated as a fixed element by operation of the third brake B3, and torque input is changed by cooperation of the each rotation shaft to be a second forward speed stage and the changed torque is output through the output shaft OS including the seventh rotation shaft TM7.

The first clutch C1, the second clutch C2 and the first brake B1 are simultaneously operated at a third forward speed stage D3. According to this, the fourth rotation shaft TM4 is connected to the eighth rotation shaft TM8 by operation of the first clutch C1, as the second rotation shaft TM2 is connected to the eighth rotation shaft TM8 by operation of the second clutch C2, torque of the input shaft IS is input to the first rotation shaft TM1. Further, as the third rotation shaft TM3 is operated as a fixed element by operation of the first brake B1, and torque input is changed by cooperation of the each rotation shaft to be a third forward speed stage and the changed torque is output through the output shaft OS including the seventh rotation shaft TM7.

The first clutch C1, the third clutch C3 and the second brake B2 are simultaneously operated at a fourth forward speed stage D4. According to this, the fourth rotation shaft TM4 is connected to the eighth rotation shaft TM8 by operation of the first clutch C1, as the second rotation shaft TM2 is connected to the fifth rotation shaft TM5 by operation of the third clutch C3, torque of the input shaft IS is input to the first rotation shaft TM1. Further, as the sixth rotation shaft TM6 is operated as a fixed element by operation of the second brake B2, and torque input is changed by cooperation of the each rotation shaft to be a fourth forward speed stage and the changed torque is output through the output shaft OS including the seventh rotation shaft TM7.

The second clutch C2, the third clutch C3 and the second brake B2 are simultaneously operated at a fifth forward speed stage D5. According to this, the second rotation shaft TM2 is connected to the eighth rotation shaft TM8 by operation of the second clutch C2, as the second rotation shaft TM2 is connected to the fifth rotation shaft TM5 by operation of the third clutch C3, torque of the input shaft IS is input to the first rotation shaft TM1. Further, as the sixth rotation shaft TM6 is operated as a fixed element by operation of the second brake B2, and torque input is changed by cooperation of the each rotation shaft to be a fifth forward speed stage and the changed torque is output through the output shaft OS including the seventh rotation shaft TM7.

The first clutch C1, the second clutch C2 and the third clutch C3 are simultaneously operated at a sixth forward speed stage D6. According to this, the fourth rotation shaft TM4 is connected to the eighth rotation shaft TM8 by operation of the first clutch C1, as the second rotation shaft TM2 is connected to the fifth rotation shaft TM5 by operation of the third clutch C3, torque of the input shaft IS is input to the first rotation shaft TM1. Then, as the first, second, third, fourth planetary gear set PG1, PG2, PG3 and PG4 are directly connected each other, and torque input is changed to be a sixth forward speed stage and the changed torque is output through the output shaft OS including the seventh rotation shaft TM7

The second clutch C2, the third clutch C3 and the first brake B1 are simultaneously operated at a seventh forward speed stage D7. According to this, the second rotation shaft TM2 is connected to the eighth rotation shaft TM8 by operation of the second clutch C2, as the second rotation shaft TM2 is connected to the fifth rotation shaft TM5 by operation of the third clutch C3, torque of the input shaft IS is input to the first rotation shaft TM1. Further, as the third rotation shaft TM3 is operated as a fixed element by operation of the first brake B1, and torque input is changed by cooperation of the each rotation shaft to be a seventh forward speed stage and the changed torque is output through the output shaft OS including the seventh rotation shaft TM7.

The second clutch C2, the third clutch C3 and the third brake B3 are simultaneously operated at an eighth forward speed stage D8. According to this, the second rotation shaft TM2 is connected to the eighth rotation shaft TM8 by operation of the second clutch C2, as the second rotation shaft TM2 is connected to the fifth rotation shaft TM5 by operation of the third clutch C3, torque of the input shaft IS is input to the first rotation shaft TM1. Further, as the second rotation shaft TM2 is operated as a fixed element by operation of the third brake B3, and torque input is changed by cooperation of the each rotation shaft to be an eighth forward speed stage and the changed torque is output through the output shaft OS including the seventh rotation shaft TM7.

The first clutch C1, the third clutch C3 and the first brake B1 are simultaneously operated at a ninth forward speed stage D9. According to this, the fourth rotation shaft TM4 is connected to the eighth rotation shaft TM8 by operation of the first clutch C1, as the second rotation shaft TM2 is connected to the fifth rotation shaft TM5 by operation of the third clutch C3, torque of the input shaft IS is input to the first rotation shaft TM1. Further, as the third rotation shaft TM3 is operated as a fixed element by operation of the first brake B1, and torque input is changed by cooperation of the each rotation shaft to be a ninth forward speed stage and the changed torque is output through the output shaft OS including the seventh rotation shaft TM7.

The first clutch C1, the third clutch C3 and the third brake B3 are simultaneously operated at a tenth forward speed stage D10. According to this, the fourth rotation shaft TM4 is connected to the eighth rotation shaft TM8 by operation of the first clutch C1, as the second rotation shaft TM2 is connected to the fifth rotation shaft TM5 by operation of the third clutch C3, torque of the input shaft IS is input to the first rotation shaft TM1. Further, as the second rotation shaft TM2 is operated as a fixed element by operation of the third brake B3, and torque input is changed by cooperation of the each rotation shaft to be a tenth forward speed stage and the changed torque is output through the output shaft OS including the seventh rotation shaft TM7.

The first clutch C1, the second brake B2 and the third brake B3 are simultaneously operated at a first reverse speed stage REV1. According to this, as the fourth rotation shaft TM4 is connected to the eighth rotation shaft TM8 by operation of the first clutch C1, torque of the input shaft IS is input to the first rotation shaft TM1. Further, as the sixth rotation shaft TM6 and the second rotation shaft TM2 are operated as fixed elements by operation of the second brake B2 and the third brake B3, and torque input is changed by cooperation of the each rotation shaft to be a first reverse speed stage and the changed torque is output through the output shaft OS including the seventh rotation shaft TM7.

The first clutch C1, the second clutch C2 and the second brake B2 are simultaneously operated at a second reverse speed stage REV2. According to this, the fourth rotation shaft TM4 is connected to the eighth rotation shaft TM8 by operation of the first clutch C1, as the second rotation shaft TM2 is connected to the eighth rotation shaft TM8 by operation of the second clutch C2, torque of the input shaft IS is input to the first rotation shaft TM1. Further, as the sixth rotation shaft TM6 is operated as a fixed element by operation of the second brake B2, and torque input is changed by cooperation of the each rotation shaft to be a second reverse speed stage and the changed torque is output through the output shaft OS including the seventh rotation shaft TM7.

The planetary gear train according to various embodiments of the present invention may achieve at least ten forward speed stages and two reverse speed stages by controlling four planetary gear sets PG1, PG2, PG3, and PG4 with three clutches C1, C2, and C3 and three brakes B1, B2, and B3.

Further, a planetary gear train of an automatic transmission for a vehicle according to various embodiments of the present invention may greatly improve silent driving by achieving adequate speed stage to rotation number of the engine through multiple speed stages of the automatic transmission.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   an input shaft receiving torque of an engine;
   an output shaft outputting changed torque of the engine;
   a first planetary gear set including first, second, and third rotation elements;
   a second planetary gear set including fourth, fifth, and sixth rotation elements;
   a third planetary gear set including seventh, eighth, and ninth rotation elements;
   a fourth planetary gear set including tenth, eleventh, and twelfth rotation elements; and
   six friction elements selectively connecting the rotation elements, or selectively connecting at least one of the rotation elements and a transmission housing,
   wherein the planetary gear train of the automatic transmission for the vehicle further comprises:
   a first rotation shaft including the first rotation element and directly connected to the input shaft;
   a second rotation shaft including the second rotation element and selectively connected to the transmission housing;
   a third rotation shaft including the third rotation element, the sixth rotation element and the ninth rotation element and selectively connected to the transmission housing;
   a fourth rotation shaft including the fourth rotation element and the eighth rotation element;
   a fifth rotation shaft including the fifth rotation element and selectively connected to the second rotation element;
   a sixth rotation shaft including the seventh rotation element and the tenth rotation element and selectively connected to the transmission housing;
   a seventh rotation shaft including the eleventh rotation element and directly connected to the output shaft; and
   an eighth rotation shaft including the twelfth rotation element and selectively connected to the second rotation shaft and the fourth rotation shaft.

2. The planetary gear train of claim 1, wherein:
the first planetary gear set is a single pinion planetary gear set and includes a first sun gear that is the first rotation element, a first planet carrier that is the second rotation element, and a first ring gear that is the third rotation element;
the second planetary gear set is a single pinion planetary gear set and includes a second sun gear that is the fourth rotation element, a second planet carrier that is the fifth rotation element, and a second ring gear that is the sixth rotation element;
the third planetary gear set is a single pinion planetary gear set and includes a third sun gear that is the seventh rotation element, a third planet carrier that is the eighth rotation element, and a third ring gear that is the ninth rotation element; and
the fourth planetary gear set is a single pinion planetary gear set and includes a fourth sun gear that is the tenth rotation element, a fourth planet carrier that is the eleventh rotation element, and a fourth ring gear that is the twelfth rotation element.

3. The planetary gear train of claim 1, wherein the six friction elements include:
a first clutch selectively connecting the fourth rotation shaft and the eighth rotation shaft;
a second clutch selectively connecting the second rotation shaft and the eighth rotation shaft;
a third clutch selectively connecting the second rotation shaft and the fifth rotation shaft;
a first brake selectively connecting the third rotation shaft and the transmission housing;
a second brake selectively connecting the sixth rotation shaft and the transmission housing; and
a third brake selectively connecting the second rotation shaft and the transmission housing.

4. The planetary gear train of claim 3, wherein speed stages achieved by selective operation of the friction elements include:
a first forward speed stage achieved by simultaneous operation of the second clutch, the first brake and the second brake;
a second forward speed stage achieved by simultaneous operation of the first clutch, the second clutch and the third brake;
a third forward speed stage achieved by simultaneous operation of the first clutch, the second clutch and the first brake;
a fourth forward speed stage achieved by simultaneous operation of the first clutch, the third clutch and the second brake;
a fifth forward speed stage achieved by simultaneous operation of the second clutch, the third clutch and the second brake;
a sixth forward speed stage achieved by simultaneous operation of the first clutch, the second clutch and the third clutch;
a seventh forward speed stage achieved by simultaneous operation of the second clutch, the third clutch and the first brake;
an eighth forward speed stage achieved by simultaneous operation of the second clutch, the third clutch and the third brake;
a ninth forward speed stage achieved by simultaneous operation of the first clutch, the third clutch and the first brake;
a tenth forward speed stage achieved by simultaneous operation of the first clutch, the third clutch and the third brake;
a first reverse speed stage achieved by simultaneous operation of the first clutch, the second brake and the third brake; and
a second reverse speed stage achieved by simultaneous operation of the first clutch, the second clutch and the second brake.

5. A planetary gear train of an automatic transmission for a vehicle, comprising:
an input shaft receiving torque of an engine;
an output shaft outputting changed torque of the engine;
a first planetary gear set being a single pinion planetary gear set and including first, second, and third rotation elements;
a second planetary gear set being a single pinion planetary gear set and including fourth, fifth, and sixth rotation elements;
a third planetary gear set being a single pinion planetary gear set and including seventh, eighth, and ninth rotation elements; and
a fourth planetary gear set being a single pinion planetary gear set and including tenth, eleventh, and twelfth rotation elements,
wherein the planetary gear train of the automatic transmission for the vehicle includes:
a first rotation shaft including the first rotation element and directly connected to the input shaft;
a second rotation shaft including the second rotation element and selectively connected to the transmission housing;
a third rotation shaft including the third rotation element, the sixth rotation element and the ninth rotation element and selectively connected to the transmission housing;
a fourth rotation shaft including the fourth rotation element and the eighth rotation element;
a fifth rotation shaft including the fifth rotation element and selectively connected to the second rotation shaft;
a sixth rotation shaft including the seventh rotation element and the tenth rotation element and selectively connected to the transmission housing;
a seventh rotation shaft including the eleventh rotation element and directly connected to the output shaft;
an eighth rotation shaft including the twelfth rotation element and selectively connected to the second rotation shaft and the fourth rotation shaft;
a first clutch selectively connecting the fourth rotation shaft and the eighth rotation shaft;
a second clutch selectively connecting the second rotation shaft and the eighth rotation shaft;
a third clutch selectively connecting the second rotation shaft and the fifth rotation shaft;
a first brake selectively connecting the third rotation shaft and the transmission housing;
a second brake selectively connecting the sixth rotation shaft and the transmission housing; and
a third brake selectively connecting the second rotation shaft and the transmission housing.

6. The planetary gear train of claim 5, wherein:
the first planetary gear set includes a first sun gear that is the first rotation element, a first planet carrier that is the second rotation element, and a first ring gear that is the third rotation element;

the second planetary gear set includes a second sun gear that is the fourth rotation element, a second planet carrier that is the fifth rotation element, and a second ring gear that is the sixth rotation element;

the third planetary gear set includes a third sun gear that is the seventh rotation element, a third planet carrier that is the eighth rotation element, and a third ring gear that is the ninth rotation element; and the fourth planetary gear set includes a fourth sun gear that is the tenth rotation element, a fourth planet carrier that is the eleventh rotation element, and a fourth ring gear that is the twelfth rotation element.

7. The planetary gear train of claim 5, wherein speed stages achieved by selective operation of three friction elements among the six friction elements including the three clutches and the three brakes include:
- a first forward speed stage achieved by simultaneous operation of the second clutch, the first brake and the second brake;
- a second forward speed stage achieved by simultaneous operation of the first clutch, the second clutch and the third brake;
- a third forward speed stage achieved by simultaneous operation of the first clutch, the second clutch and the first brake;
- a fourth forward speed stage achieved by simultaneous operation of the first clutch, the third clutch and the second brake;
- a fifth forward speed stage achieved by simultaneous operation of the second clutch, the third clutch and the second brake;
- a sixth forward speed stage achieved by simultaneous operation of the first clutch, the second clutch and the third clutch;
- a seventh forward speed stage achieved by simultaneous operation of the second clutch, the third clutch and the first brake;
- an eighth forward speed stage achieved by simultaneous operation of the second clutch, the third clutch and the third brake;
- a ninth forward speed stage achieved by simultaneous operation of the first clutch, the third clutch and the first brake;
- a tenth forward speed stage achieved by simultaneous operation of the first clutch, the third clutch and the third brake;
- a first reverse speed stage achieved by simultaneous operation of the first clutch, the second brake and the third brake; and
- a second reverse speed stage achieved by simultaneous operation of the first clutch, the second clutch and the second brake.

8. A planetary gear train of an automatic transmission for a vehicle, comprising:
- an input shaft receiving torque of an engine;
- an output shaft outputting changed torque of the engine;
- a first planetary gear set that is a single pinion planetary gear set and includes a first sun gear, a first planet carrier, and a first ring gear;
- a second planetary gear set that is a single pinion planetary gear set and includes a second sun gear, a second planet carrier, and a second ring gear;
- a third planetary gear set that is a single pinion planetary gear set and includes a third sun gear, a third planet carrier, and a third ring gear; and
- a third planetary gear set that is a single pinion planetary gear set and includes a third sun gear, a third planet carrier, and a third ring gear; and wherein the planetary gear train of an automatic transmission for a vehicle includes:
- a first rotation shaft including the first sun gear and directly connected to the input shaft;
- a second rotation shaft including the first planet carrier and selectively connected to a transmission housing;
- a third rotation shaft including the first ring gear, the second ring gear and the third ring gear and selectively connected to the transmission housing;
- a fourth rotation shaft including the second sun gear and the third planet carrier;
- a fifth rotation shaft including the second planet and selectively connected to the second rotation shaft;
- a sixth rotation shaft including the third sun gear and the fourth sun gear selectively connected to the transmission housing;
- a seventh rotation shaft including the fourth planet and directly connected to the output shaft;
- an eighth rotation shaft including the fourth ring gear and selectively connected to the second rotation shaft and the fourth rotation shaft; and
- six friction elements selectively connecting the rotation shafts, or selectively connecting at least one rotation shaft and the transmission housing.

9. The planetary gear train of claim 8, wherein the six friction elements include:
- a first clutch selectively connecting the fourth rotation shaft and the eighth rotation shaft;
- a second clutch selectively connecting the second rotation shaft and the eighth rotation shaft;
- a third clutch selectively connecting the second rotation shaft and the fifth rotation shaft;
- a first brake selectively connecting the third rotation shaft and the transmission housing;
- a second brake selectively connecting the sixth rotation shaft and the transmission housing; and
- a third brake selectively connecting the second rotation shaft and the transmission housing.

10. The planetary gear train of claim 9, wherein speed stages achieved by selective operation of three friction elements among the six friction elements include:
- a first forward speed stage achieved by simultaneous operation of the second clutch, the first brake and the second brake;
- a second forward speed stage achieved by simultaneous operation of the first clutch, the second clutch and the third brake;
- a third forward speed stage achieved by simultaneous operation of the first clutch, the second clutch and the first brake;
- a fourth forward speed stage achieved by simultaneous operation of the first clutch, the third clutch and the second brake;
- a fifth forward speed stage achieved by simultaneous operation of the second clutch, the third clutch and the second brake;
- a sixth forward speed stage achieved by simultaneous operation of the first clutch, the second clutch and the third clutch;
- a seventh forward speed stage achieved by simultaneous operation of the second clutch, the third clutch and the first brake;

an eighth forward speed stage achieved by simultaneous operation of the second clutch, the third clutch and the third brake;
a ninth forward speed stage achieved by simultaneous operation of the first clutch, the third clutch and the first brake;
a tenth forward speed stage achieved by simultaneous operation of the first clutch, the third clutch and the third brake;
a first reverse speed stage achieved by simultaneous operation of the first clutch, the second brake and the third brake; and
a second reverse speed stage achieved by simultaneous operation of the first clutch, the second clutch and the second brake.

* * * * *